Oct. 17, 1933.     E. F. BACON     1,930,546
FLOAT GAUGE
Filed Aug. 24, 1931

Inventor
Elbridge F. Bacon
By Blackmore, Spencer & Hulse
Attorneys

Patented Oct. 17, 1933

1,930,546

UNITED STATES PATENT OFFICE 1,930,546

FLOAT GAUGE

Elbridge F. Bacon, Flint, Mich., assignor to A C Spark Plug Company, Flint, Mich., a company of Michigan Application August 24, 1931. Serial No. 559,042

6 Claims. (Cl. 73—82)

This invention relates to a liquid level gauge and has particular reference to improvements relating to the tank unit installed at the container or gasoline tank of automotive vehicles.

In the use of electrical gasoline gauges of the type shown in the patent issued to Bacon, No. 1,791,786 on Feb. 10, 1931, it was found that there was rapid vibration of the pointer due to the rapid changes in liquid level when the vehicle was in motion. These changes in liquid level are caused by waves or surges in the gasoline in the tank which cause the float to bob up and down. This rapid upward and downward movement caused a corresponding rapid movement of the pointer and in some instances the movement or vibration was so rapid that the pointer was no longer visible. The present invention has for its object to incorporate in a gasoline gauge tank unit a means to dampen the rapid oscillations of the float because of waves or surges in the liquid and also to combine with the tank unit a ventilation opening and the ordinary outflow pipe from the tank. The ordinary outlet or gasoline pipe from the tank usually has been separately constructed from the tank unit which necessitated the making of a separate opening in the tank.

The construction for obtaining the dampening of the float comprises a washer which surrounds one of the movable members of the gauge mechanism. A plate is placed over the washer and a coil spring forces the plate against the washer to create a frictional movement to retard the movements of the member. The friction created by the spring and washer is not sufficiently great to prevent the movement of the float but will retard or prevent any small movement such as is caused by a wave or surge in the liquid in the tank.

Figure 1:
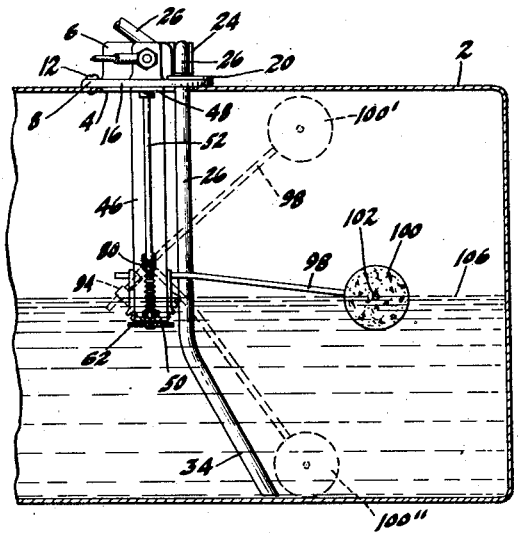
Fig. 1 shows a container in section with the invention applied thereto.

On the drawing the number 2 indicates a suitable liquid container such as the gasoline tank of an automotive vehicle. The tank has the opening 4 at its upper portion which is closed by a housing 6. The housing has the annular flange 8 having the openings 10 for the reception of machine screws 12, by means of which it is secured to the tank. A plate 14 fits over the flange 8 which has the edge 16 crimped thereover as is best shown in Fig. 1. The housing 6 preferably is flattened at one side as shown at 18 and on the flange 8 at the flattened side there is secured the bracket 20 having the upstanding finger 22 notched as at 24 to receive and support the gasoline pipe line 26. The bracket 20 is secured to the flange 8 by means of rivets 28 which pass through a flange 8 and plate 14. The machine screws 12 pass through the opening 30 in the bracket 20. The bracket 20 as well as the flange 8 and plate 14 have the conformable openings 32 through which the outlet pipe 26 passes. The outlet pipe 26 extends to the bottom of the container as shown at 34 in Fig. 1.

Interiorly of the housing 6, preferably at the cylindrical side, there is mounted the resistance 36 electrically connected to the housing at one end by means of the rivet 38 but insulated therefrom over the remainder of its extent. The other end of the resistance is in electrical contact with the terminal 40 which has the electric wire 42 connected thereto and leads to a differential galvanometer such as is disclosed in the previously mentioned Bacon patent.

Bracket 46 is mounted on the plate 14 by means of rivets extending through the plate 14. The bracket 46 has its ends turned at right angles as indicated at 48 and 50, the upper angled portion 48 serving as a means to attach the bracket to the plate 14, suitable rivets passing through openings in the part 48 and through openings in the plate 14. A shaft 52 is turnably mounted in the bracket 46 and has its upper end 54 (Fig. 4) turned at right angles to point in the direction of the resistance 36. Stops 55 limit the swing of the end 54. A contact cap 56 preferably of silver, or silver plated, or a silver alloy is loosely fitted on the end 54 and the coil spring 58 resiliently urges the cap 56 on the resistance. The silver or silver alloy contact cap is the invention of Jay T. Ford.

At the lower end of the shaft 52 there is permanently mounted the journal member or bearing 60 and the gear 62. The journal member 60 is stepped and has the upper enlarged portion 64 which rests on the lower angle member 50 of the bracket 46; the bearing portion 66 which passes through an opening in the angle at 50 and forms the journal on which the shaft 52 turns; and the reduced end 68 to receive the opening in the gear 62. The end is peened over at 70 to secure the gear on the journal member 60.

Figure 2:
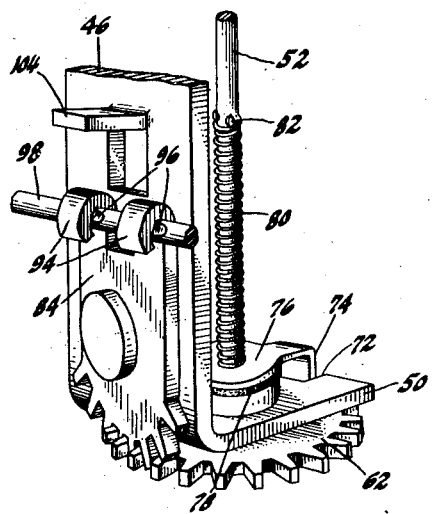
Fig. 2 is an enlarged detailed perspective view of the lower portion of the tank unit.

The angular end 50 is recessed as indicated at 72 and receives the finger 74 formed as an extension of a plate 76 having a central opening through which the shaft 52 passes. The finger 74 extends substantially at right angles to a plate 76. A washer or other suitable friction member 78, preferably of non-metallic material, is positioned between the plate 76 and the enlarged portion 64 of the journal member 60. A coil spring 80 surrounds the shaft 52 and is held thereon by the pinched portions 82 formed on the shaft as shown in Fig. 2. The pinched portions 82 and the plate 76 confine the spring 80 under tension therebetween. The spring 80 constantly urges the plate 76 against the washer 78 to produce friction which will retard the rotary movement of the shaft 52.

A segment 84 is turnably mounted on the upright portion of the bracket 46 by means of the journal pin 88 which is preferably rigidly mounted in the bracket. The pin 88 has the enlarged head 90 and the bearing portion 92. The segment 84 has an opening corresponding to the bearing portion 92.

The upper portion of the segment is forked and has the tines 94 of the fork bent over onto flattened portions 96 on a float arm or rod 98. The rod 98 has a suitable cork or other float 100 attached to the angularly bent end 102. The extreme upper and lower portions of the float 100 are shown at 100' and 100''.

A suitable finger 104 is pressed from the upright portion of the bracket 46 to form a stop to limit the swing of the float arm 98. Either the arm 98 or its free end strikes against the finger 104, for the extreme positions of the float 100.

The operation of the structure showing in Figs. 1 to 4 inclusive is as follows: Assuming that the vehicle is standing still and the float is in the position shown in full lines of Figure 1 the contact 56 will be at substantially the mid point of resistance 36 to indicate that the tank is half full. When the vehicle starts in motion it will cause the level 106 of the gasoline to change because of the waves or surges in the liquid. The surges or waves will cause the float 100 rapidly to move or bob up and down, which rapid movement would cause a corresponding rapid movement of the contact cap 56 and of the pointer of the differential galvanometer shown in the Bacon patent referred to in the foregoing. The friction created by the pressure of the spring 80 between the plate 76 enlarged portion 64 and washer 78 will be sufficient to retard or substantially prevent small movements in the float 100 but is not sufficient to prevent movement thereof such as are necessary when the level of the liquid falls gradually from float position 100' to float position 100 or 100''. This prevention of the smaller movements of the float will prevent oscillations in the pointer of the galvanometer on the instrument board and will therefore give a more accurate reading of the liquid level in the tank.

Figure 4:
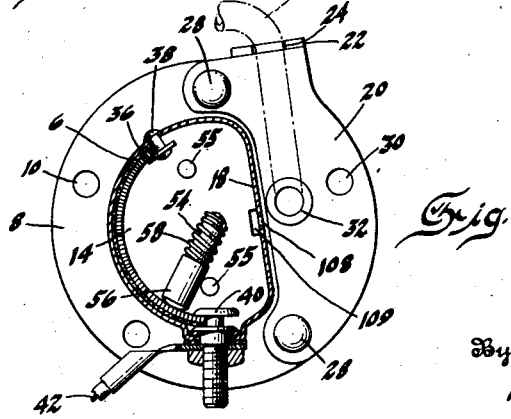
Fig. 4 is a sectional plan view of the mechanism.

By referring to Fig. 4 it will be noted that small vent openings 108 and 109 have been placed in the housing 6 toward the top portion thereof, and in the plate 14, respectively, to act as air or vent openings for the tank 2. In the prior practice it was customary to supply a separate goose neck to obtain the desired ventilation. In the present invention the goose neck is eliminated and the function thereof performed by the openings 108 and 109 in the housing and plate of the liquid level tank unit.

Figure 3:
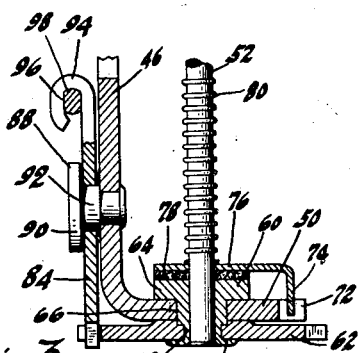
Fig. 3 is a section through the lower portion of the tank unit.
Figure 5:
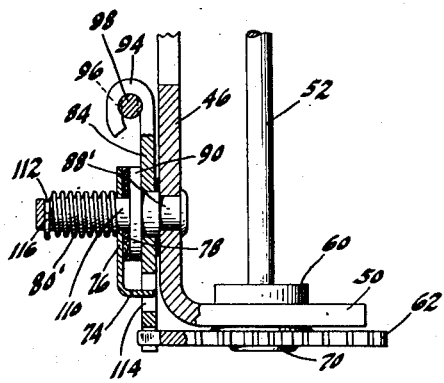
Fig. 5 is a view corresponding to Fig. 3 of a modification.

Fig. 5 is a modification of the structure shown in Fig. 3 and accomplishes the same function and object. In Fig. 5 the journal pin 88' has an extension 110 with an opening 112 in the end thereof. The segment 84 is provided with an opening 114 for the reception of the tongue 74 of the plate 76. A friction washer or member 78 of metallic or non-metallic material is confined by the plate 76 and the head 90 of the journal member 88'. A coil spring 80' has its end 116 secured in the opening 112 and resiliently presses the plate 76 against the friction washer 78. The operation of the structure Fig. 5 is the same as that of Figs. 2 and 3, except that the friction is created at the journal pin 88' instead of at the end of the shaft 52.

I claim:

1. In a liquid level guage for containers, a float mechanism mounted on and extending into said container, said mechanism including a bracket, a shaft turnably mounted in said bracket and operating an element of the liquid level gauge, a float arm having a float connected thereto, means interconnecting said arm and shaft to communicate movements of the float to the shaft, friction means on said interconnecting means, and a spring confined on said shaft acting on said friction means to restrain said shaft from turning to dampen oscillations or sudden movements of the float.

2. In a liquid level gauge for containers, a float mechanism mounted on and extending into said container, said mechanism including a bracket, a bearing, a shaft mounted at one end in said bearing and operating a portion of the gauge, float operated means for turning said bearing and shaft, friction means on said bearing, and a coil spring confined around said shaft and acting on said friction means to retard the turning movement of the shaft and bearing to compensate for sudden changes in the liquid level.

3. In a liquid level gauge, a container having a liquid the level of which is to be determined, a bracket rigidly mounted relative to and extending into the container, a shaft rotatably mounted in the bracket, a float arm having a float secured thereto, a gear secured to the float arm, a bearing secured to the bracket on which said gear is turnably mounted, a gear secured to the shaft and meshing with the first-named gear, friction means on said bearing, a spring, means to mount the spring adjacent the bearing, said spring acting on said means to retard the movement of the gears to compensate for sudden changes in liquid level.

4. In a liquid level gauge, a float mechanism responsive to changes in liquid level, means for retarding the movement of said mechanism, comprising a bearing element on said mechanism, friction means mounted on said bearing element, a plate over the element, a spring, and means to mount the spring to cause said spring to press the friction means between the bearing element and the plate.

5. In a liquid level gauge, a float mechanism responsive to changes in liquid level, a bracket forming a part of said mechanism, means for retarding the movement of said mechanism, comprising a journal on the bracket for a part of the mechanism, a plate mounted on the journal and movable with said part of the mechanism, friction means between the plate and the journal, a spring, and means to mount the spring adjacent the journal to urge the plate and journal into frictional engagement with the friction means.

6. In a liquid level gauge, a geared mechanism having a float arm responsive to changes in liquid level, said mechanism including a bracket, a bearing pin rigidly mounted in the bracket, one member of the said mechanism being mounted on said bearing pin, friction means mounted on the pin, a plate mounted on the pin and connected to the said one member to move therewith, and a spring mounted on the pin and pressing against the plate to increase the friction between the plate and pin.

ELBRIDGE F. BACON.